(12) United States Patent
Snider et al.

(10) Patent No.: US 8,459,034 B2
(45) Date of Patent: Jun. 11, 2013

(54) METHODS AND APPARATUS FOR OPERATING GAS TURBINE ENGINES

(75) Inventors: David August Snider, Simpsonville, SC (US); Willy Steve Ziminsky, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 1000 days.

(21) Appl. No.: 11/752,053

(22) Filed: May 22, 2007

(65) Prior Publication Data
US 2008/0289314 A1 Nov. 27, 2008

(51) Int. Cl.
F02C 1/00 (2006.01)
F02C 3/00 (2006.01)
F02C 9/00 (2006.01)

(52) U.S. Cl.
USPC ............... 60/739; 60/734; 60/39.37

(58) Field of Classification Search
USPC ............... 60/734, 739, 740, 39.37, 790, 243, 60/244, 776, 39.281, 737
See application file for complete search history.

(56) References Cited

U.S. PATENT DOCUMENTS

| | | | | |
|---|---|---|---|---|
| 2,629,225 | A * | 2/1953 | Ammann | 60/248 |
| 4,157,012 | A | 6/1979 | DuBell | |
| 5,020,329 | A | 6/1991 | Ekstedt et al. | |
| 5,148,667 | A | 9/1992 | Morey | |
| 5,165,223 | A | 11/1992 | Ingham et al. | |
| 5,319,931 | A * | 6/1994 | Beebe et al. | 60/773 |
| 5,345,757 | A | 9/1994 | MacLean et al. | |
| 5,365,732 | A * | 11/1994 | Correa | 60/39.281 |
| 5,865,024 | A | 2/1999 | Kress et al. | |
| 6,367,239 | B1 | 4/2002 | Brown et al. | |
| 6,393,823 | B1 | 5/2002 | Badeer | |
| 6,405,524 | B1 | 6/2002 | Mistry et al. | |
| 6,481,209 | B1 | 11/2002 | Johnson et al. | |
| 6,497,103 | B2 | 12/2002 | Johnson et al. | |
| 6,655,152 | B2 * | 12/2003 | Griffiths et al. | 60/773 |
| 6,736,338 | B2 | 5/2004 | Johnson et al. | |
| 6,968,693 | B2 | 11/2005 | Colibaba-Evulet et al. | |
| 6,968,699 | B2 * | 11/2005 | Howell et al. | 60/776 |
| 7,188,465 | B2 * | 3/2007 | Kothnur et al. | 60/39.281 |
| 2001/0047650 | A1 * | 12/2001 | Muller et al. | 60/39.06 |
| 2005/0097895 | A1 * | 5/2005 | Kothnur et al. | 60/776 |
| 2010/0043387 | A1 * | 2/2010 | Myers et al. | 60/39.281 |

FOREIGN PATENT DOCUMENTS

| | | | |
|---|---|---|---|
| GB | 2134184 | * | 8/1984 |
| GB | 2239056 | * | 10/1989 |
| GB | 2239056 | * | 6/1991 |
| GB | 2239056 A | | 6/1991 |
| JP | 54036412 A | | 3/1979 |

OTHER PUBLICATIONS

Chinese Search Report, Application No. 200110108511.X dated Feb. 22, 2013, pp. 2.

* cited by examiner

*Primary Examiner* — Gerald Sung
(74) *Attorney, Agent, or Firm* — Armstrong Teasdale LLP

(57) ABSTRACT

A fuel delivery system for a gas turbine engine includes one or more subsets of combustors, and at least two fuel manifolds including a fuel manifold coupled to each combustor subset and configured to deliver fuel to only the subset of combustors during a predetermined gas turbine engine operating mode. A gas turbine engine assembly including a fuel delivery system and a method of operating a gas turbine engine is also described herein.

8 Claims, 4 Drawing Sheets

METHODS AND APPARATUS FOR OPERATING GAS TURBINE ENGINES

BACKGROUND OF THE INVENTION

This invention relates generally to gas turbine engines, and more specifically to methods and apparatus for operating gas turbine engines.

Gas turbine engines generally include, in serial flow arrangement, a high-pressure compressor for compressing air flowing through the engine, a combustor in which fuel is mixed with the compressed air and ignited to form a high temperature gas stream, and a high-pressure turbine. The high-pressure compressor, combustor and high-pressure turbine are sometimes collectively referred to as the core engine. Such gas turbine engines also may include a low-pressure compressor, or booster, for supplying compressed air to the high-pressure compressor.

To improve performance, the gas turbine engine is optimized for full load operation so as to reduce fuel consumption while still providing the desired power. Similarly, the combustion system is optimized for full load operation to reduce emissions during normal operation. For modern premixed combustion designs, this optimization drives a maximum of the available airflow to the premixing device to keep combustion temperatures low and minimize the formation of oxides of nitrogen, which are a strong function of temperature. It is well established that the rate of formation of oxides of nitrogen is a function of the peak reaction temperatures, and they themselves are driven by the fuel to air ratio in the combustor. Fuel to air ratios on either side of the stoichiometric ratio result in lower peak temperatures, with operation on the "lean" side (i.e. more air than fuel) as the preferred embodiment for dry low NOx designs.

However, during some operational conditions, it is desirable to operate the gas turbine engine at reduced power levels. To reduce the power output on the gas turbine, the fuel, the air, or the rotational speed can be reduced. Most large heavy duty gas turbines operate at a fixed mechanical speed, hence to reduce power, they rely on decreasing fuel flow and air flow. If only the airflow is reduced, the power output is decreased, and operating temperatures in the combustor may exceed their intended design point. If only fuel flow is reduced, the combustor may approach lean stability limitations. In general, power is reduced by decreasing together both air flow and fuel flow, while at the same time mitigating lean stability issues by the use of pilots or fuel staging (such as in a multi-nozzle device). Nevertheless, regardless of the approach, a condition is reached while trying to reduce power, where the combustor operating temperatures may be too low to complete combustion of the fuel, which may result in an increase in pollutants such as carbon monoxide, for example.

DESCRIPTION OF THE INVENTION

In one aspect, a method for delivering fuel in a gas turbine engine is provided. The gas turbine engine includes a can annular combustor array that includes at least one combustor level subset within the array supplied by an independent fuel delivery system. The method includes supplying fuel only to one or more subsets during a first mode of operation, and supplying fuel to the entire array of combustors during a second mode of operation.

In another aspect, a fuel delivery system for a gas turbine engine is provided. The fuel delivery system includes one or more subsets of combustors, and at least two fuel manifolds comprising a fuel manifold coupled to each combustor subset and configured to deliver fuel to only the subset of combustors during a predetermined gas turbine engine operating mode.

In a further aspect, a gas turbine engine assembly is provided. The gas turbine engine assembly includes a first combustor subset, a second combustor subset, and a fuel delivery system comprising at least two fuel manifolds, wherein a first fuel manifold is coupled to the first combustor subset and a second fuel manifold is coupled to the second combustor subset, each of the first and second fuel manifold is configured to deliver fuel to only the respective subset of combustors during a predetermined gas turbine engine operating mode.

DETAILED DESCRIPTION OF THE INVENTION

Figure 1:
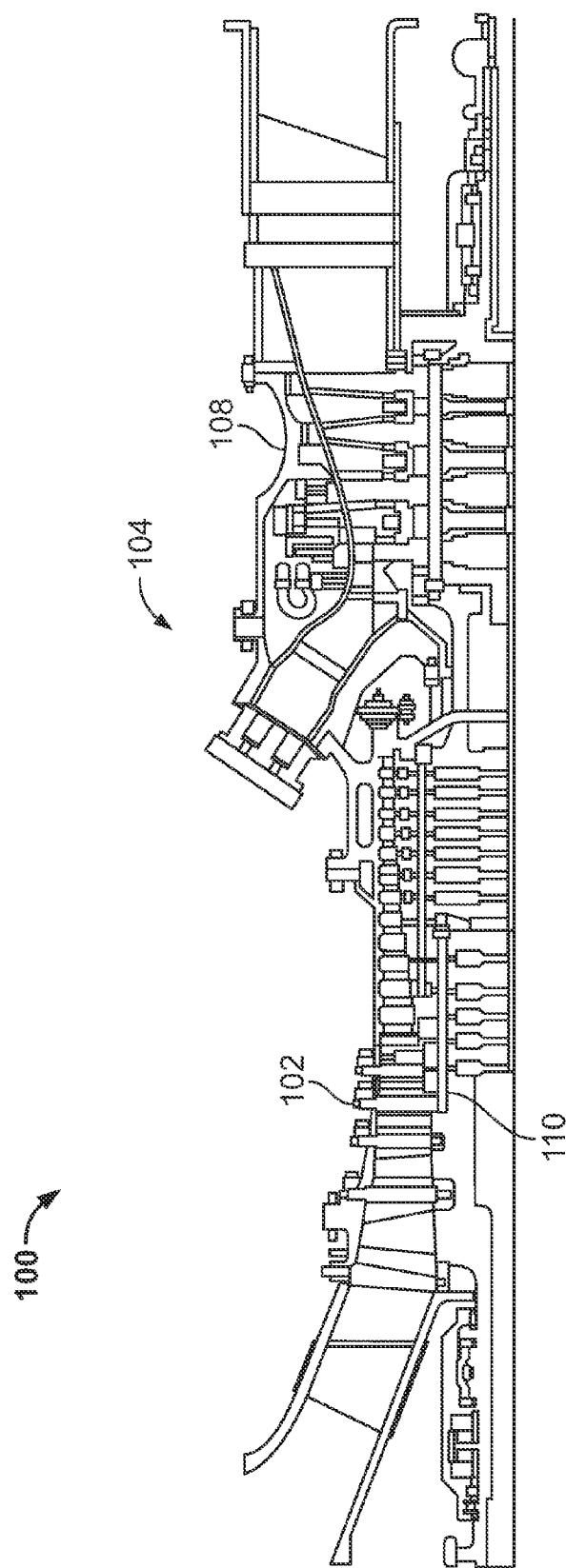
FIG. 1 is a schematic view of an exemplary gas turbine engine.

FIG. 1 is a schematic illustration of an exemplary gas turbine engine 100. Engine 100 includes a compressor 102 and a plurality of can annular combustors 104. Engine 100 also includes a turbine 108 and a common compressor/turbine shaft 110 (sometimes referred to as rotor 110).

In operation, air flows through compressor 102 and compressed air is supplied to combustors 104. Fuel is channeled to a combustion region, within combustors 104 wherein the fuel is mixed with the air and ignited. Combustion gases are generated and channeled to turbine 108 wherein gas stream thermal energy is converted to mechanical rotational energy. Turbine 108 is rotatably coupled to, and drives, shaft 110.

Figure 2:
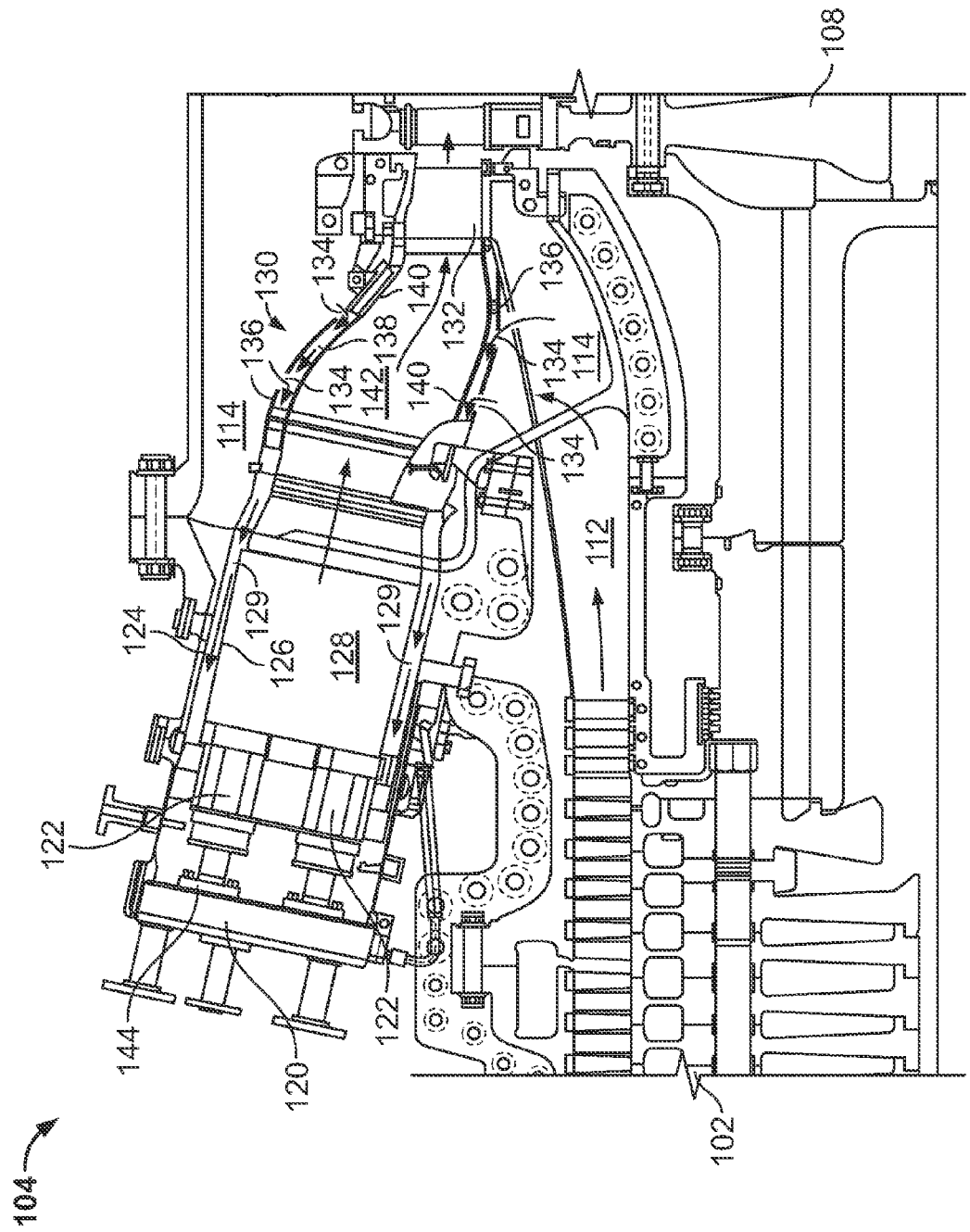
FIG. 2 is a cross-sectional schematic view of an exemplary combustor that may be used with the gas turbine engine shown in FIG. 1.

FIG. 2 is a cross-sectional schematic view of a combustor 104. Combustor assembly 104 is coupled in flow communication with turbine assembly 108 and with compressor assembly 102. Compressor assembly 102 includes a diffuser 112 and a compressor discharge plenum 114 that are coupled in flow communication to each other.

In the exemplary embodiment, combustor assembly 104 includes an end cover 120 that provides structural support to a plurality of fuel nozzles 122. End cover 120 is coupled to combustor casing 124 with retention hardware (not shown in FIG. 2). A combustor liner 126 is positioned within and is coupled to casing 124 such that liner 126 defines a combustion chamber 128. An annular combustion chamber cooling passage 129 extends between combustor casing 124 and combustor liner 126.

A transition portion or piece 130 is coupled to combustor casing 124 to facilitate channeling combustion gases generated in chamber 128 towards turbine nozzle 132. In the exemplary embodiment, transition piece 130 includes a plurality of openings 134 formed in an outer wall 136. Piece 130 also includes an annular passage 138 defined between an inner wall 140 and outer wall 136. Inner wall 140 defines a guide cavity 142.

In operation, turbine assembly 108 drives compressor assembly 102 via shaft 110 (shown in FIG. 1). As compressor assembly 102 rotates, compressed air is discharged into diffuser 112 as the associated arrows illustrate. In the exemplary embodiment, the majority of air discharged from compressor assembly 102 is channeled through compressor discharge plenum 114 towards combustor assembly 104, and a smaller portion of compressed air may be channeled for use in cooling engine 100 components. More specifically, the pressurized compressed air within plenum 114 is channeled into transition piece 130 via outer wall openings 134 and into passage 138. Air is then channeled from transition piece annular passage 138 into combustion chamber cooling passage 129. Air is discharged from passage 129 and is channeled into fuel nozzles 122.

Fuel and air are mixed and ignited within combustion chamber 128. Casing 124 facilitates isolating combustion chamber 128 and its associated combustion processes from the outside environment, for example, surrounding turbine components. Combustion gases generated are channeled from chamber 128 through transition piece guide cavity 142 towards turbine nozzle 132. In the exemplary embodiment, fuel nozzle assembly 122 is coupled to end cover 120 via a fuel nozzle flange 144.

Figure 3:
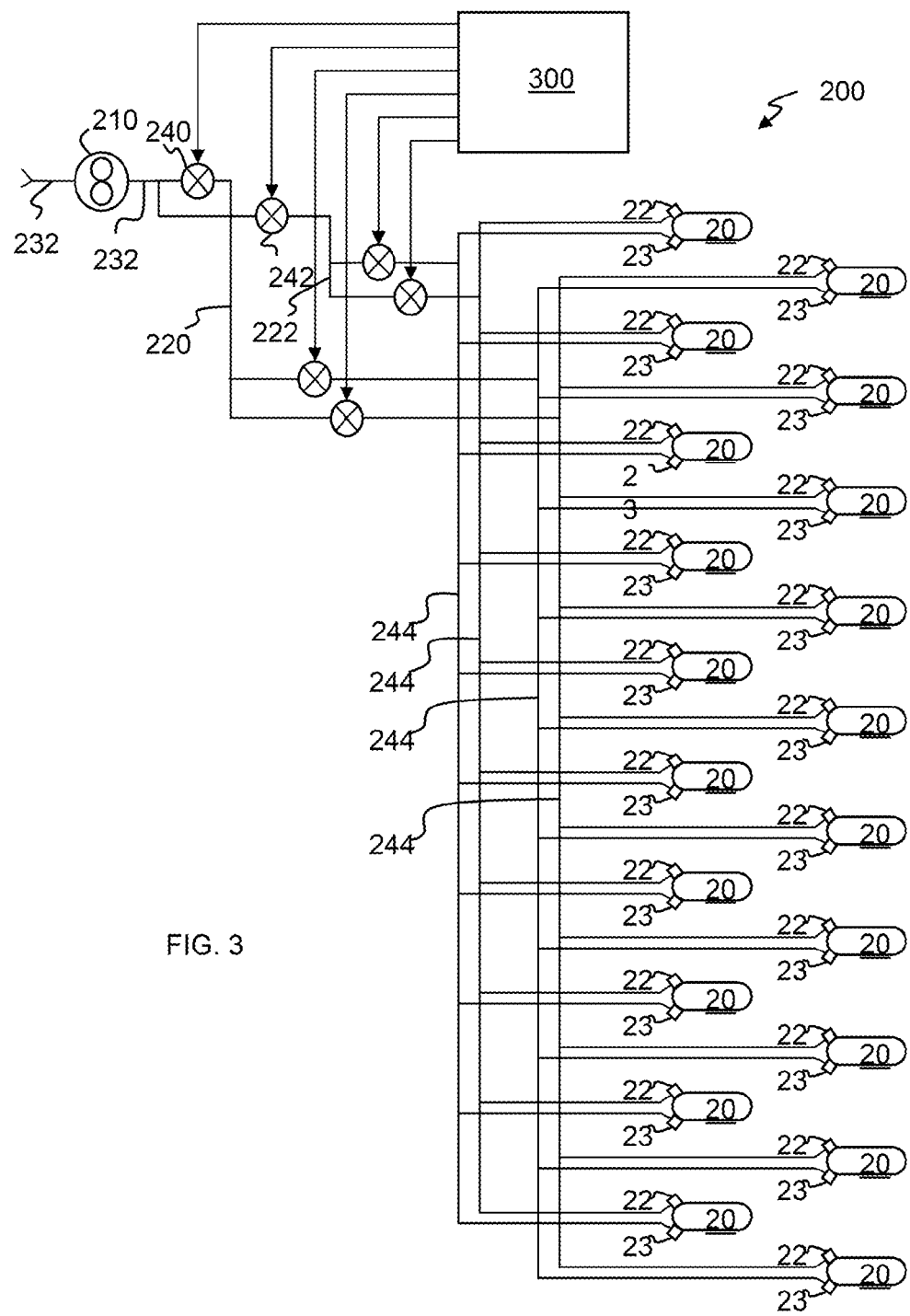
FIG. 3 is a simplified block diagram of an exemplary fuel delivery system.

FIG. 3 is a simplified block diagram of an exemplary fuel delivery system 200 that may be utilized with the gas turbine engine shown in FIGS. 1 and 2. In the exemplary embodiment, gas turbine engine 10 includes eighteen combustor sections 20 that, in the embodiment, form an annular ring. In the exemplary embodiment, each combustor section 20 includes at least one fuel nozzle assembly 22.

The fuel nozzle assemblies 22 are located circumferentially about the periphery of engine 10 proximate to combustor section 20. Specifically, combustor sections 20 form an annular ring around an inner periphery of the gas turbine engine, and as such, the fuel nozzle assemblies, and the fuel manifolds also form an annular ring circumferentially around gas turbine engine 10.

Although, the exemplary embodiment illustrate gas turbine engine 10 including eighteen combustor sections 20 and eighteen fuel nozzle assemblies 22, it should be realized that fuel system 200 may be utilized with a gas turbine engine including n combustor sections and n*x fuel nozzles 22, wherein n≧2 and x≧1. For example, gas turbine engine 10 may include n=18 combustors, moreover, if x=1, engine 10 includes 18 fuel nozzles, i.e. one fuel nozzle per combustor. Optionally, if x=2, engine 10 includes 36 fuel nozzles, i.e. two fuel nozzles per combustor, etc. Additionally, nozzles within the combustion chamber can be further sub-grouped by an internal or external manifold at the combustion chamber level, and with an external manifold 244 at the array level such that a given nozzle sub-group has a common supply at the array or array subset level.

Fuel delivery system 200 includes a fuel pump 210 that is configured to receive fuel from a fuel supply (not shown). Fuel pump 210 is utilized to deliver fuel to at least a primary fuel manifold 220 and a secondary fuel manifold 222. The primary and secondary fuel manifolds 220 and 222 are both metered and sized to achieve a pressure ratio within fuel delivery system 200 appropriate for the quantity of fuel being delivered to the gas turbine engine. The primary and secondary manifolds themselves can be an aggregate of multiple subset manifolds, where both primary and secondary arrangements include manifolds 244 to independently supply and control nozzle sub-groups at the combustor chamber level.

Specifically fuel delivery system 200 includes a fuel suction line 230 which extends from the fuel source to an inlet of fuel pump 210, and a discharge line 232 that extends from the discharge side of fuel pump 210 to each of the primary and secondary fuel manifolds 220 and 222. In the exemplary embodiment, a first staging valve 240 is disposed in discharge line 232 between pump 210 and primary manifold 220, and a second staging valve 242 is disposed in discharge line 232 between pump 210 and secondary manifold 222.

Although, the exemplary embodiment shown in FIG. 3 illustrates fuel delivery system 200 as including two manifold 220 and 222, it should be realized that fuel delivery system 200 may have three or more fuel manifolds. For example, FIG. 3 illustrates that primary manifold 220 delivers fuel to nine combustor sections 20 and secondary manifold 222 also delivers fuel to nine combustor sections 20. However, fuel delivery system may include three manifolds wherein each manifold delivers fuel to six combustor sections, etc. In the exemplary embodiment, the combustor array may include multiple combustor can subsets, wherein each subset may include multiple nozzle sub-groupings. Additionally, the spacing and number of cans supplied by each manifold may be varied depending on aeromechanic or other system considerations.

Figure 4:
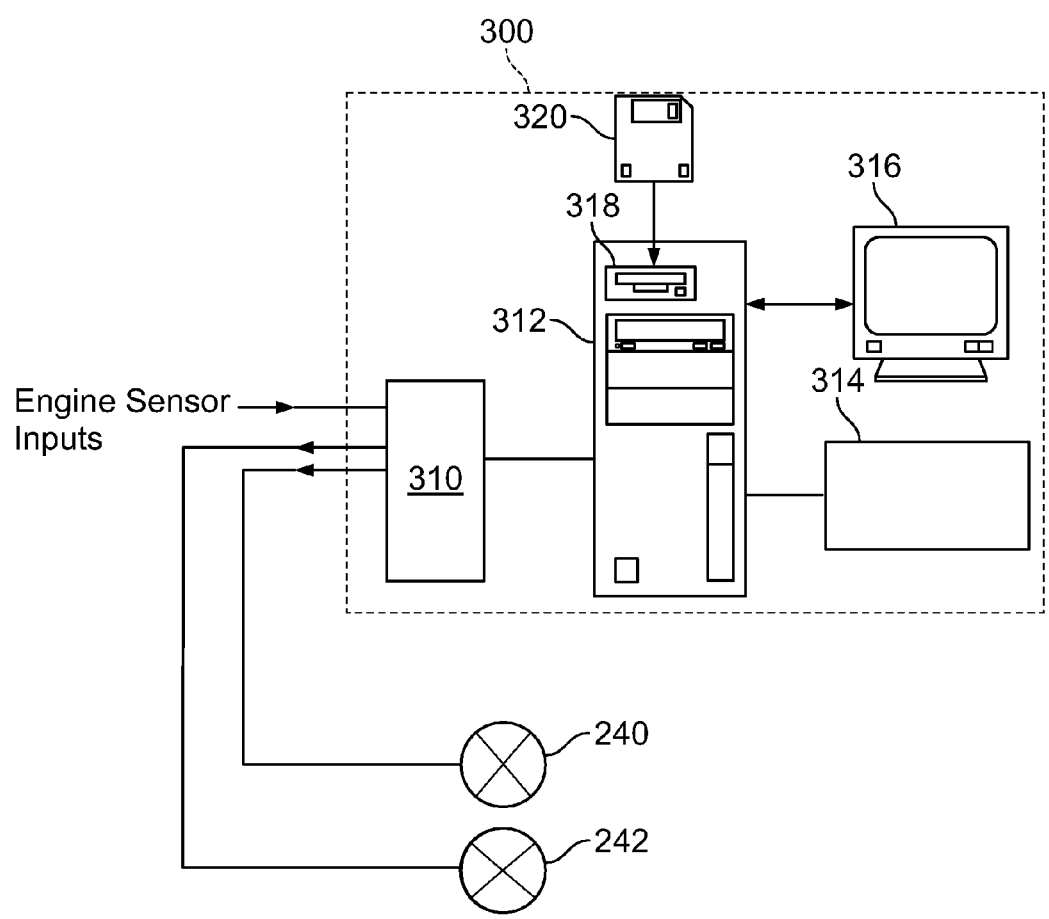
FIG. 4 is a simplified block diagram of an exemplary control system shown in FIG. 3.

FIG. 4 is an exemplary control system 300 that may be utilized to operate and/or control the exemplary fuel delivery system 200 shown in FIG. 3. Control system 300 is an electronic control unit (ECU) or an engine monitoring unit (EMU) such as a Full Authority Digital Engine Control (FADEC), or a Modernized Digital Engine Control (MDEC). In an alternative embodiment, engine control system 300 includes any engine controller that is configured to send and/or receive signals from gas turbine engine 10 to facilitate control and/or monitoring of fuel delivery system 200. Specifically, as used herein, an ECU can be any electronic device that resides on or around an engine and includes a processor and at least one of software and/or hardware that is programmed to control and/or monitor fuel delivery system 10.

Conventional engine data sensors (not shown) are provided to sense selected data parameters related to the operation of gas turbine engine 10. Such data parameters can include, but are not limited to, ambient air temperature, and engine parameters such as exhaust gas temperature, oil temperature, engine fuel flow, gas turbine engine speed, compressor discharge pressure, turbine exhaust pressure, and/or a plurality of other signals received from gas turbine engine 10

As shown in FIG. 4, control system 300 includes a control interface section 310 that samples analog data received from the above described engine sensors and outputs a control signal to each of the first and second staging valves 240, 242 during selected engine operating conditions.

More specifically, control interface section 310 converts the analog data received from the engine sensors to digital signals for subsequent processing. A computer 312 receives the sampled and digitized sensor data from control interface section 310 and performs high-speed data analysis. Computer 312 may also receive commands from an operator via a keyboard 314. An associated monitor 316 such as, but not limited to, a liquid crystal display (LCD) and/or a cathode ray tube, allows the operator to observe data received from computer 312. The operator supplied commands and parameters are used by computer 312 to provide control signals and information to control interface section 310.

In one embodiment, computer 312 includes a device 318, for example, a floppy disk drive, CD-ROM drive, DVD drive, magnetic optical disk (MOD) device, and/or any other digital device including a network connecting device such as an Ethernet device for reading instructions and/or data from a computer-readable medium 320, such as a floppy disk, a CD-ROM, a DVD or an other digital source such as a network or the Internet, as well as yet to be developed digital means. In another embodiment, computer 312 executes instructions stored in firmware (not shown). Computer 312 is programmed to perform the functions described herein, and as used herein, the term computer is not limited to just those integrated circuits generally known as computers, but broadly refers to computers, processors, microcontrollers, microcomputers, programmable logic controllers, application specific integrated circuits, and other programmable circuits, and these terms are used interchangeably herein.

In operation, fuel delivery system 200 is capable of delivering fuel to gas turbine engine 10 during all operating conditions. Specifically, control system 300 is configured to activate or open first staging valve 240 during a first mode of operation. For example, during an initial engine startup mode, computer 312 may be programmed to open first staging valve 240 and ensure that second staging valve 242 is commanded closed. In the first mode of operation, fuel is supplied, via pump 210, through first staging valve 240, through the primary manifold 220 and into the plurality of combustor sections 20. As shown in FIG. 3, in this mode of operation, fuel is supplied to only one-half of the combustor sections 20 and fuel is not supplied to the remaining combustor sections. That is, the combustor sections receiving fuel are interposed with the combustor sections not receiving fuel such that every other combustor section is being utilized to generate power. More specifically, each combustor section receiving fuel is disposed adjacent to a combustor section that is not receiving fuel in the first mode of operation. Though the given spacing and arrangement of the array subsets is determined by the power level desired and the aeromechanic considerations of the turbine section.

In a second mode of operation, control system 300 is configured to activate or open second staging valve 242 such that fuel is supplied, via pump 210, through second staging valve 240, through the secondary manifold 220 and into the remaining combustion sections. In the second mode of operation, fuel delivery system 200 permits additional fuel to flow to remaining combustor sections 22 to increase the power output of the gas turbine engine 10. Accordingly, in the second mode of operation, both the primary and secondary manifolds are supplying fuel to all of the combustor sections. In this mode of operation, fuel delivery system 200 establishes two independently controlled, parallel fuel supplies to the combustion system. More specifically, during base load, or high levels of part load, both systems are identically controlled base on the existing control curves.

In a third mode of operation, referred to herein as a power "turn down" mode, when a reduced power output from gas turbine engine is desired, the appropriate fuel circuits are transitioned to shut off the fuel flow to a selected set of combustion cans. In this embodiment, either first or second staging valves 240 or 242 are closed such that fuel is only supplied to one-half of the combustor sections 220.

Described herein is an exemplary fuel delivery system that is configured to restrict the fuel flow to selected fuel nozzle assemblies to reduce emissions during selected operating conditions. The exemplary fuel delivery system is also configured to optimize power turndown operations of the gas turbine engine, allowing the end user to have a more profitable operation, while also reducing emissions. Additionally, the fuel delivery system improves the robustness of the gas turbine in peaking or load following applications, i.e. if the case can be made to run at minimum turndown conditions rather than incurring a damaging shutdown/startup cycle).

Also described herein is an exemplary method of operating a gas turbine engine. The method includes supplying fuel only to the primary combustors during a first mode of operation, and supplying fuel to the primary and secondary combustors during a second mode of operation.

The fuel delivery system described herein is configured to develop parallel fuel circuits to allow fuel flow to be isolated from selected combustors such that the gas turbine engine may operate at substantially reduced power levels (power "turn down" conditions) while substantially improving the emissions and lean blowout margins compared to current methods for power turn down. The exemplary fuel delivery system also enables significantly lower levels of power turn down than are currently possible.

For example, during base load, or high levels of part load, both the primary manifold and the secondary manifolds are identically controlled base on the existing control curves. When minimum power turndown is commanded, the appropriate fuel circuits would be transitioned to shut off the fuel flow to a selected set of combustion cans. As such, the reduction in power does not require a reduction in the combustion temperatures. Therefore it will not have a negative impact on the emissions output of the system. Moreover, significantly lower levels of turndown will be manageable. The same conditions that currently produce 50% turndown can be applied to the combustion cans that remain in operation. For example, if half the cans are isolated, and the remaining half are at the current 50% turn down fuel setting, a 25% turn down can be achieved with emissions and lean blowout margin comparable to the current 50% turndown. Existing efforts to allow the combustors to operate at even lower power levels may enable turndown levels below 25%.

While the invention has been described in terms of various specific embodiments, those skilled in the art will recognize that the invention can be practiced with modification within the spirit and scope of the claims.

What is claimed is:

1. A fuel delivery system for a gas turbine engine, said fuel delivery system comprising: a computer controller configured to control a fuel flow through the fuel delivery system; a plurality of subsets of can annular combustors comprising at least a first combustor subset and a second combustor subset; a plurality of fuel manifolds comprising at least a first fuel manifold coupled to said first combustor subset and a second fuel manifold coupled to said second combustor subset; a plurality of staging valves comprising a first staging valve disposed between a fuel pump and said first fuel manifold such that said first staging valve controls fuel flow to said entire first combustor subset and a second staging valve disposed between said fuel pump and said second fuel manifold such that said second staging valve controls fuel flow to said entire second combustor subset, wherein said computer controller controls said first and second staging valves such that said first and second staging valves are selectively closeable independent of each other; a plurality of sub-groups of nozzles coupled to said plurality of subsets of combustors, wherein each said nozzle sub-group is supplied by a respective external manifold such that each said nozzle sub-group is separately controlled by each respective external manifold of each respective combustor subset, wherein in a first operating mode, said computer controller is configured to open said first staging valve and close said second staging valve such that fuel is channeled only to said first combustor subset, and in a second operating mode, said computer controller is configured to open said first and second staging valves such that fuel is channeled independently via said fuel delivery system to said first and second can annular combustor subsets, wherein said first operating mode is an engine startup operating mode and said second operating mode is a base load operating mode.

2. A fuel delivery system in accordance with claim 1 wherein said gas turbine engine includes n combustors, wherein said first combustor subset comprises n/2 combustors and said second combustor subset comprises the remaining n/2 combustors.

3. A fuel delivery system in accordance with claim 1 wherein said first combustor subset is interposed between said second combustor subset.

4. A gas turbine engine assembly comprising: a first can annular combustor subset; a second can annular combustor subset; a fuel delivery system comprising a computer controller configured to control a fuel flow through said fuel delivery system, a first fuel manifold coupled to said first combustor subset, a second fuel manifold coupled to said second combustor subset, a first staging valve disposed between a fuel pump and said first fuel manifold such that said first staging valve controls fuel flow to said entire first combustor subset, and a second staging valve disposed between said fuel pump and said second fuel manifold such that said second staging valve controls fuel flow to said entire second combustor subset, wherein said computer controller controls said first and second staging valves such that said first and second staging valves are selectively closeable independent of each other; and a plurality of sub-groups of nozzles coupled to said first and second can annular combustor subsets, wherein each said nozzle sub-group is supplied by a respective external manifold such that each said nozzle sub-group is separately controlled by each respective external manifold of each respective combustor subset, wherein in a first operating mode, said computer controller is configured to open said first staging valve and close said second staging valve such that fuel is channeled only to said first combustor subset, and in a second operating mode, said computer controller is configured to open said first and second staging valves such that fuel is channeled independently via said fuel delivery system to said first and second can annular combustor subsets, wherein said first operating mode is an engine startup operating mode and said second operating mode is a base load operating mode.

5. A gas turbine engine assembly in accordance with claim 4, wherein said gas turbine engine assembly comprises n combustors, said first combustor subset comprises n/2 combustors and said second combustor subset comprises the remaining n/2 combustors.

6. A gas turbine engine assembly in accordance with claim 4 wherein said first combustor subset is interposed between said second combustor subset.

7. A gas turbine engine assembly in accordance with claim 4, further comprising a third combustor subset, said fuel delivery system comprising a third fuel manifold coupled to said third combustor subset.

8. A gas turbine engine assembly in accordance with claim 7, wherein said third combustor subset is interposed between said first and second combustor subsets.

* * * * *